United States Patent
Yoshizawa et al.

(10) Patent No.: US 10,136,221 B2
(45) Date of Patent: Nov. 20, 2018

(54) SOUND PROCESSING UNIT, SOUND PROCESSING SYSTEM, AUDIO OUTPUT UNIT AND DISPLAY DEVICE

(71) Applicant: Maxell, Ltd., Kyoto (JP)

(72) Inventors: Kazuhiko Yoshizawa, Yokahama (JP); Nobuaki Kabuto, Kunitachi (JP); Atsushi Yoshioka, Ebina (JP)

(73) Assignee: Maxell, Ltd., Kyoto (JP)

( * ) Notice: Subject to any disclaimer, the term of this patent is extended or adjusted under 35 U.S.C. 154(b) by 322 days.

(21) Appl. No.: 14/465,836

(22) Filed: Aug. 22, 2014

(65) Prior Publication Data

US 2014/0363018 A1 Dec. 11, 2014

Related U.S. Application Data

(63) Continuation of application No. 12/983,034, filed on Dec. 31, 2010, now Pat. No. 8,903,105, which is a
(Continued)

(30) Foreign Application Priority Data

Mar. 29, 2002 (JP) ................................ 2002-093545

(51) Int. Cl.
*H04R 29/00* (2006.01)
*H04B 3/00* (2006.01)
(Continued)

(52) U.S. Cl.
CPC ............... *H04R 5/04* (2013.01); *H04N 5/607* (2013.01); *H04N 21/43615* (2013.01);
(Continued)

(58) Field of Classification Search
CPC ............ H04N 5/60; H04N 5/62; H04N 5/607; H04N 5/602; H04N 5/4446; H04N 5/38;
(Continued)

(56) References Cited

U.S. PATENT DOCUMENTS 6,321,278 B1 * 11/2001 Phu ......................... G06F 3/165
381/81
6,981,076 B1 * 12/2005 Kitten ....................... G06F 3/16
379/388.02
(Continued)

FOREIGN PATENT DOCUMENTS

JP 06-068189 9/1994
JP 07-15723 1/1995
(Continued)

OTHER PUBLICATIONS

Notification of Reasons for Refusal received for Japanese Application 2010-023713 from the Japanese Patent Office.
(Continued)

*Primary Examiner* — Xu Mei
(74) *Attorney, Agent, or Firm* — Mattingly & Malur, PC

(57) ABSTRACT

Practical speaker connection is identified using a device having a sound channel of a 5.1 channel or 7.1 channel, and a device is provided that can easily reproduce the optimum multiple channels. Actual speaker arrangement can be identified by, for example, measuring the impedance of a terminal at the side of an audio amplifier. If incorrect connection is found, a warning is issued. This information is transmitted to a signal source with an EDID and a signal with the optimum a number of sound channel is sent. The EDID is also used for the connection with a display unit and the speaker connection with which the display unit is provided uniquely. For example, a sound through the 7.1 channel is easily reproduced using the speaker of the display unit in the channel of the front speaker.

2 Claims, 11 Drawing Sheets

Related U.S. Application Data continuation of application No. 12/251,345, filed on Oct. 14, 2008, now Pat. No. 8,213,630, which is a continuation of application No. 11/703,300, filed on Feb. 6, 2007, now abandoned, which is a continuation of application No. 10/346,379, filed on Jan. 15, 2003, now abandoned.

(51) Int. Cl.
| | | |
|---|---|---|
| *H04R 5/04* | (2006.01) | |
| *H04R 5/02* | (2006.01) | |
| *H04N 5/60* | (2006.01) | |
| *H04R 3/12* | (2006.01) | |
| *H04N 21/436* | (2011.01) | |
| *H04N 21/485* | (2011.01) | |
| *H04N 21/488* | (2011.01) | |

(52) U.S. Cl.
CPC ....... *H04N 21/485* (2013.01); *H04N 21/4882* (2013.01); *H04R 3/12* (2013.01); *H04R 5/02* (2013.01); *H04R 2205/024* (2013.01); *H04R 2420/05* (2013.01)

(58) Field of Classification Search
CPC ........ H04N 5/4401; H04N 5/44; H04N 5/455; H04N 21/485; H04N 21/4852; H04N 21/2368; H04N 21/4305; H04N 21/4341; H04N 21/4307; H04R 3/12; H04R 5/04; H04R 27/00; H04R 29/00; H04R 29/001; H04R 29/004; H04R 29/007; H04R 2420/03; H04R 2420/07; H04H 20/83; H04H 60/04

USPC ............. 381/58, 59, 77, 79, 80, 81, 82, 123; 348/723, 725, 736, 738, 515

See application file for complete search history.

(56) References Cited

U.S. PATENT DOCUMENTS

| | | | |
|---|---|---|---|
| 8,320,586 B2* | 11/2012 | Shen | .................... H04R 29/001 |
| | | | 381/104 |
| 9,118,998 B2* | 8/2015 | Lin | .......................... H04R 3/12 |
| 2001/0029616 A1* | 10/2001 | Jin | ..................... H04N 5/44513 |
| | | | 725/133 |

FOREIGN PATENT DOCUMENTS

| | | |
|---|---|---|
| JP | 2001-025085 A | 1/2001 |
| JP | 2010-191203 A | 9/2010 |

OTHER PUBLICATIONS

Notice of Allowance and Allowed Claims received for Japanese Application 2010-023713 from the Japanese Patent Office.

* cited by examiner

FIG. 7

FRONT SPEAKER IS NOT CONNECTED.
5.1 CHANNEL IS REPRODUCED USING MONITOR SPEAKER.

FIG. 8

CHECK THAT FRONT-RIGHT SPEAKER IS CONNECTED.

SELECT SOUND REPRODUCTION METHOD.

1. USE ONLY MONITOR SPEAKER
2. USE 5.1 CHANNEL INCLUDING MONITOR SPEAKER
3. CONNECT FRONT-RIGHT SPEAKER AND USE IT THROUGH 5.1 CHANNEL
4. CONNECT FRONT-RIGHT SPEAKER AND USE IT THROUGH 7.1 CHANNEL INCLUDING MONITOR SPEAKER

SOUND PROCESSING UNIT, SOUND PROCESSING SYSTEM, AUDIO OUTPUT UNIT AND DISPLAY DEVICE

CROSS-REFERENCE TO RELATED APPLICATIONS

This application is continuation application of U.S. patent application Ser. No. 12/983,034, filed on Dec. 31, 2010, which is a continuation application of U.S. patent application Ser. No. 12/251,345, filed on Oct. 14, 2008, which is a continuation of U.S. patent application Ser. No. 11/703,300, filed Feb. 6, 2007, which is a continuation of U.S. patent application Ser. No. 10/346,379, filed Jan. 15, 2003, and which claims priority from Japanese Application No. 2002-093545, filed Mar. 29, 2002, each of which is incorporated by reference herein in its entirety for all purposes.

BACKGROUND OF THE INVENTION

1. Field of the Invention

The present disclosure relates to an art for clearly reproducing sound signals of multiple channels (for example, 5.1 channel and 7.1 channel) obtained from television broadcasting or a storage device, such as a VCR (Video Cassette Recorder), a DVD (Digital Versatile Disc), or a hard disc recorder. Various embodiments can be applied to a broadcasting receiving unit (hereinafter referred to as an STB (set-top-box)) that receives television broadcasting and outputs a sound signal and a video signal, a sound signal source (needless to say, the video signal can also be output), a sound processing unit, such as a switcher, for processing a signal from this sound signal source and distributing the signal to multiple speakers, or a display device, such as a television receiver.

2. Background and Related Art

In television broadcasting and package media, such as movie software products, the digitalization of video and sound signals is advancing. The realization of multiple channels in a digital sound signal advances. For example, some DVD audio includes what is referred to as 5.1 channel sound, in which five channels (typically including the front left (FL), the front right (FR), the center (C), the rear left (RL), and the rear right (RR)) and a sub woofer (S) are used for reproducing sound. Further, 7.1 channel audio can further include a front left center (FLC) and a front right center (FRC) speaker.

When the realization of multiple channels of a sound signal advances in this manner, the connection of a speaker cable becomes complicated and there is a possibility of incorrect connection. As a first prior art for simplifying the connection work of many speakers, for example, the art described in Japanese Patent Laid-Open No. 2001-25085 is generally known. It is disclosed in this literature that when a speaker of the 5.1 channel is connected, the arrangement of the speaker is judged with a test signal output from the speaker, and inappropriate arrangement and connection are posted if they are found, and at the same time the connection with the speaker is switched by an audio amplifier.

As a second prior art, for example, the art described in Japanese Patent Laid-Open No. H10 (1998)-94086 is known. It is disclosed in this literature that a terminal not connected to a speaker is detected and a sound signal to be supplied to the speaker is allocated to another speaker.

BRIEF SUMMARY OF THE INVENTION

In the aforementioned first prior art, however, a method of automatically taking action only by a warning indication was not suggested when some speakers are not connected to a sound signal processing unit. For example, even if a switcher with an audio amplifier that is one of sound signal processing units corresponds to a 5.1 channel, there is a possibility of a sound effect becoming unsatisfactory when the user does not perform appropriate processing.

In a second prior art, processing is performed automatically, and a manual instruction for sound processing is not required. In the second prior art, however, sound signal allocation processing is performed only in the audio amplifier. Accordingly, for example, even when a sound signal source connected to an audio amplifier cannot identify a speaker number connected to the audio amplifier, and when multiple sound signals such as a stereophonic sound system and the 5.1 channel can be supplied, an appropriate sound signal cannot be supplied.

Further, it was not taken into consideration in the aforementioned first and second prior arts that even a speaker originally installed in a display device, such as a television receiver, is utilized, and a display unit of a display device is utilized when the speaker is connected.

Embodiments in accordance with the present disclosure are made in consideration of the aforementioned and other such problems. An object of the present invention is to provide an art for transmitting a connected state of a speaker connected to a sound processing unit to a sound signal source and requesting sound data suitable for the connected state, and enabling the reproduction of a sound suitably. Further, the present invention provides an art that enables the reproduction of more excellent sound by utilizing even a speaker installed in a display device. Moreover, the present invention provides such an art that can easily check the connection of a complicated multi-channel speaker utilizing the display unit of the display device.

To achieve the aforementioned object, the present invention is provided with a detection circuit that detects a connected state of a speaker for each output terminal of a sound signal that corresponds to multiple sound channels and a control circuit for sending information about the connected state of the speaker, for example, to a sound signal source, such as an STB, in a sound signal processing unit, such as a switcher unit. The configuration of this sound processing unit can also be provided in a display device, such as a television receiver.

The sound signal source receives the information about the connected state of the aforementioned speaker and controls a number of sound channel supplied to the sound processing unit based on the input information.

Specifically, the aforementioned sound processing unit, if it is detected by the aforementioned detection circuit that the speakers of specific channels (for example, the front right (FR) channel and the front left (FL) channel, and/or the center (C) channel) are not connected ought also be configured so that the sound signals of these specific channels can multiplex with video signals and reproduced by the speaker that belongs to the display device.

Further, to connect a speaker, it is desirable that an OSD (On Screen Display) circuit is provided, and a visual message regarding the connected state of the speaker should be supplied to the user through this OSD circuit using a detection result by the detection circuit. This message ought also to include the information that indicates the incorrect connection of a speaker and the presence of the speaker connection, for example. Further, to display the arrangement of the speaker by the aforementioned OSD circuit and issue a test sound signal to each speaker, an indication for visually judging the speaker under test ought also to be performed.

BRIEF DESCRIPTION OF THE DRAWINGS

FIG. 7 is a drawing showing a display example in the display unit used in the present invention;

FIG. 8 is another drawing showing the display example in the display unit used in the present invention;

DETAILED DESCRIPTION OF THE INVENTION

Figure 1:
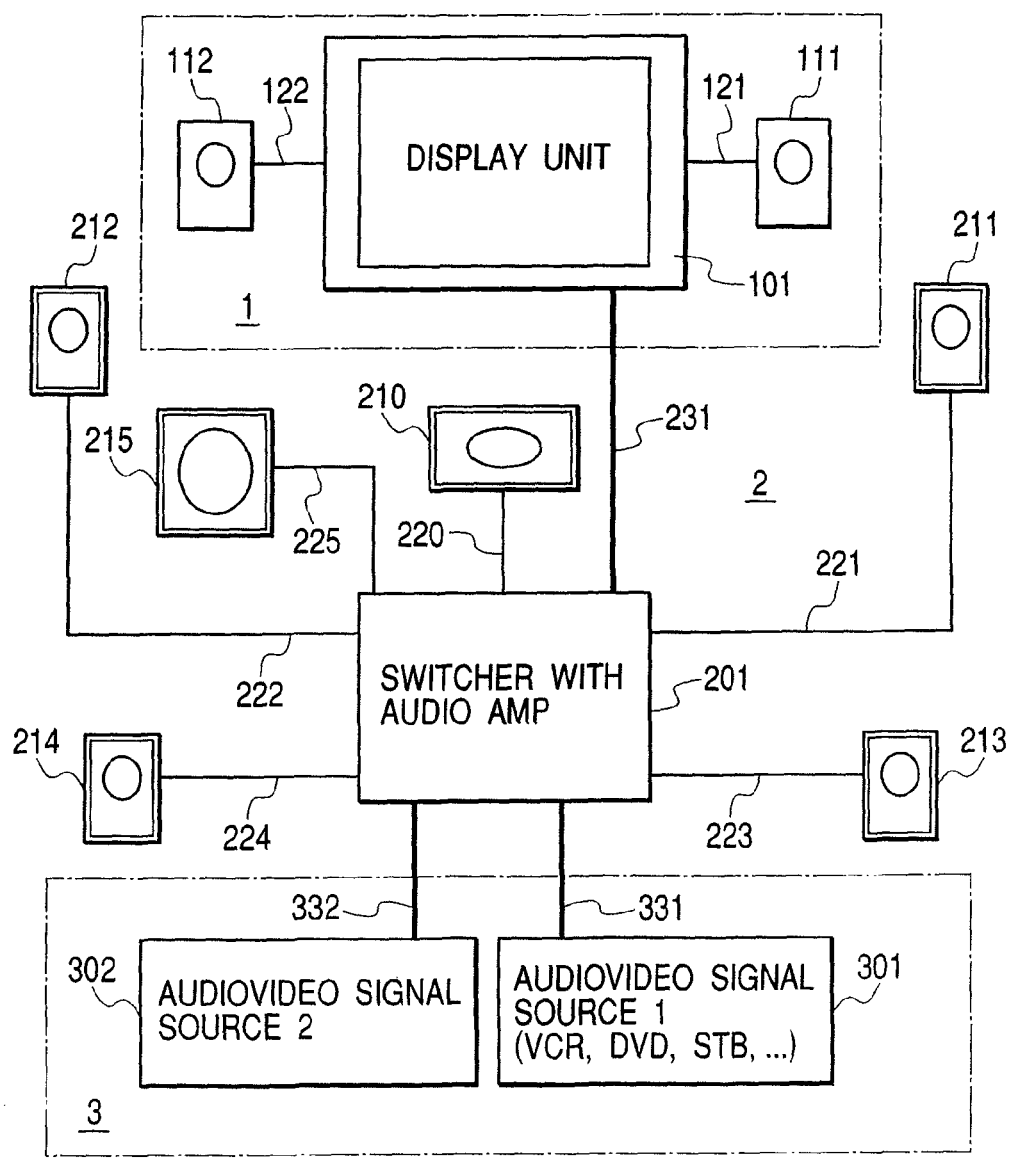
FIG. 1 is a device block diagram showing an embodiment of the present invention.

Embodiments of the present invention are described below with reference to the drawings. FIG. 1 is a device block diagram showing an embodiment of the present invention. The device of this embodiment has a display device 1, a sound reproducing apparatus 2, and a signal source 3. The display device 1 and the sound reproducing apparatus 2 are mutually connected through an audio/video signal transmission line 231 including a plug and play function. This transmission line may also be an interface with sound transmission line and video transmission line like DVI 1.0 (Digital Visual Interface version 1.0) established by the DDWG (Digital Display Working Group) that is the connection specification between a PC (Personal Computer) itself and a display device. Further, the transmission line may also be an interface for multiplexing a digital video signal and a digital sound signal.

Besides, in the following explanation of this embodiment, the "plug and play function" allows a signal sending unit to grasp characteristic data of a signal receiving unit without personal assistance and to automatically send the optimum signal to the signal receiving unit when the signal sensing unit and the signal receiving unit are connected with a cable.

The embodiment is devised so that a speaker in a state in which it can function practically can be posted to an audio/video signal source. Further, when a state of speaker connection changes, the embodiment is devised so that the audio/video signal source can identify this state and the audio output suitable for a new state can be obtained even in operation.

First, a switcher 201 measures the impedance of a load in each terminal to which speaker cables 220 to 225 are connected and detects the presence of speaker connection. Such a strict measurement is not necessary only for the presence, but even a method of providing a signal source having output impedance and roughly measuring a voltage that appears in a terminal is acceptable. Further, for example, because a sub woofer 210 is a special speaker that reproduces a low-pitched sound, it is designed to be different in internal impedance from another speaker. Otherwise, if high frequency impedance is reduced by connecting between input terminals using a capacitor, the type of the speaker as well as the presence of the connection can be judged and incorrect connection can be detected.

Besides, as described later, because the system of the present invention is characterized by having a display unit 101, the detected speaker connection is shown in the display unit, and a warning can be indicated if there is an incorrect connection. Further, for example, although the RL (rear left) speaker is connected in the speakers at the rear side, the RR (rear right) speaker is not connected. At this occasion, this indication warns that RR speaker is not connected. Moreover, a message indicating that a signal in which the RL and RR speakers are added is output from the RL speaker side can also be posted.

Further, for example, when a speaker is connected to the 5.1 channel, the layout drawing of a typical speaker is displayed on the display unit 101 and a test signal is sent to every speaker. Simultaneously, even the layout error of the speaker can simply be identified by having a function that displays the speaker on the display unit, such as blinking, and lets the user to check whether there is a conflict with a direction where a sound comes practically.

Subsequently, after a speaker to which the switcher 201 is connected practically is detected, the configuration for posting this speaker to audio/video signal sources 301, 302 is described. This is performed to implement the plug and play function by adding information about speaker connection to an EDID (Extended Display Identification Data) established by the VESA (Video Electronics Standards Association) as an identifier, for example. This EDID shows the specifications (a supportable horizontal frequency range and a pixel number) of a display device. That information about the connected state of the speaker is added to this EDID signal and posted to the audio/video signal sources 301, 302.

A switcher sends an EDID according to a request of an audio/video signal source. If the switcher has previously detected a speaker, it sends the EDID which has been rewritten from the initial speaker arrangement to the practically connected speaker. Further, if the EDID has already been sent before the speaker is detected, the connections between the switcher 201 and the audio/video signal sources 301, 302 are disconnected once using a hot plug function and a new EDID is resent after the speaker is detected. For this purpose, the information whether the EDID has already been sent or not, may be also stored in a RAM (Random Access Memory) or such. Besides, the hot plug function originally indicates whether a sound reproducing apparatus and an audio/video signal source are connected with a cable. Because short disconnection time, such as dozens of milliseconds, may fail to detect desirably, the disconnection time should be approximately 0.5 to 2 seconds if accurate operation is taken into consideration. A device function is interrupted in this disconnection time. If a hot plug line is prepared independently, a virtual disconnection which only hot plug line is disconnected and an audio/video transmission line keep to connect, is available. This virtual disconnection technique provides seamless transmission of video and sound signals can also continue.

Against the case where there is no hot plug function, it is still more convenient that an audio/video signal source should be provided with a function of cyclically reading EDID every predetermined time, for example, approximately 0.5 to 2 seconds.

Subsequently, the audio/video transmission line 231 with a plug and play function is described. The case where neither FR speaker 211 or FL speaker 212 is connected nor found is taken into consideration with reference to the device block diagram of FIG. 2. The speaker marked by oblique lines in the diagram is connected by a speaker cable. The speaker cables 221, 222 are drawn by a dashed line in the diagram, and not connected as marked by an X mark. These two speakers 211, 212 are indispensable for obtaining a sound field with a correct ambience. Accordingly, when the aforementioned switcher 201 with an audio amplifier detects that these speakers are not connected, the switcher 201 sends sound signals for the FR and FL channels to the display unit 101, thereby to reproduce a sound by a front-right speaker 111 and a front-left speaker 112 of the display unit.

This can eliminate defects caused by missing the front main speakers. The switcher 201 can identify whether a speaker is connected to the display unit 101 or not by reading an EDID transmitted via the audio/video transmission line 231. For that purpose, The display unit 101 should have a function of detecting whether the aforementioned speaker is connected practically or not. Besides, when the FR speaker 211 and the FL speaker 212 are connected, the front-right speaker 111 and the front-left speaker 112 of the display unit need not be used. In this case, the switcher 201 should send mute data or the sound signal whose level lowers rather than usual ought to be sent, or stop to send a sound signal to the display unit 101.

Figure 2:
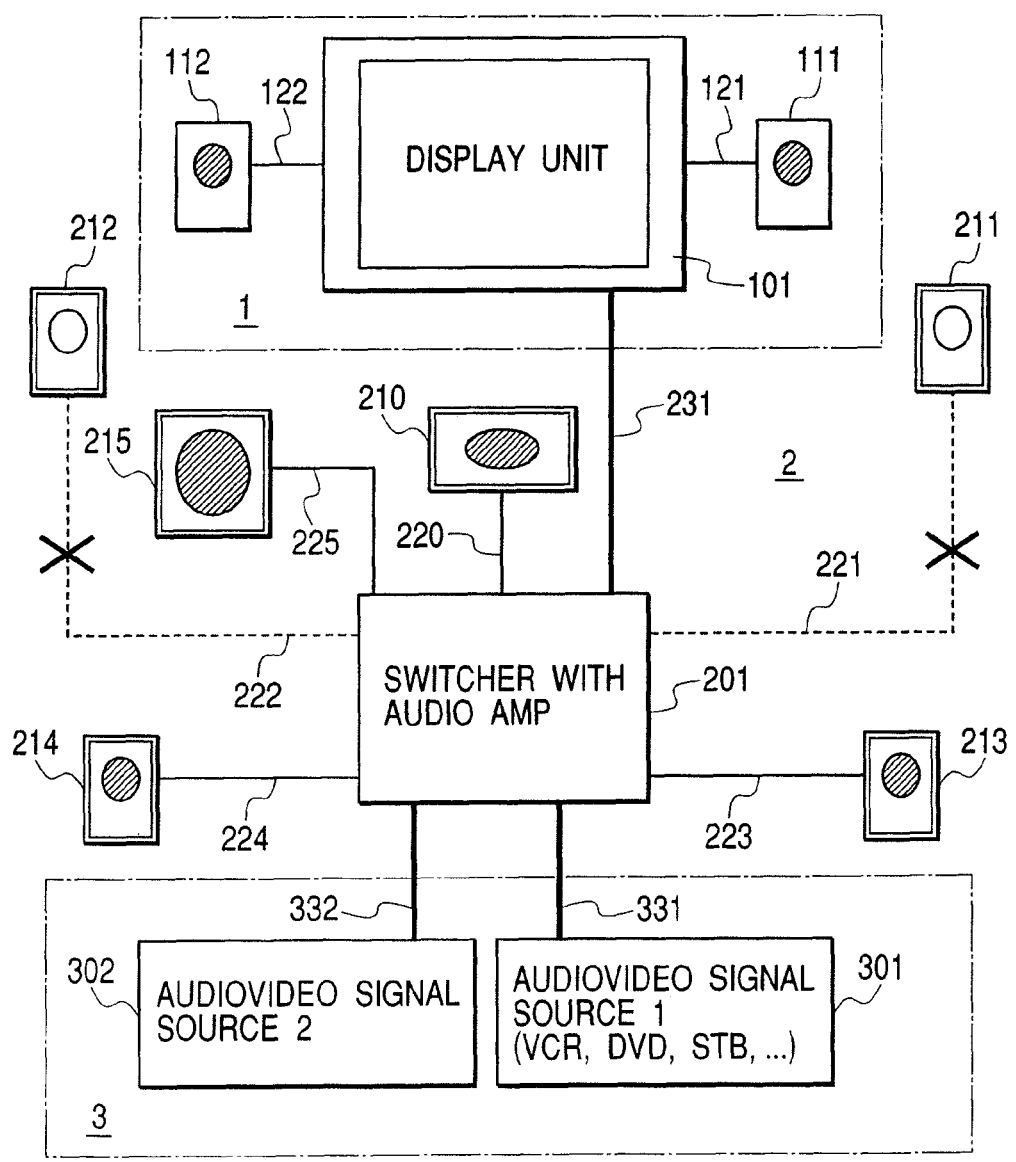
FIG. 2 is a device block diagram showing another embodiment of the present invention.

Further, as described previously, it is easily understood for the user to display the layout drawing of the speaker shown in FIG. 2 in the display unit 101 at device startup and display the presence of each speaker connection. For this purpose, an OSD (On Screen Display) circuit for displaying a drawing and a character ought to be provided in the switcher 201.

In the example of FIG. 2, if a sound of the 5.1 channel is generated from the audio/video signal source 301 or 302, the sound of the 5.1 channel can be reproduced using the speakers 111, 112 of the display unit. Accordingly, when it is detected that the speakers 211, 212 are not connected, the guidance as shown typically in FIG. 7, on the display unit 101 may be useful.

Even if the speakers 211, 212 of the FR and FL channels are connected as a modification of the aforementioned item, when the central speaker 210 of the C channel is not connected, the switcher 201 sends a sound signal of the C channel and ought also to be able to reproduce a sound by the front-right speaker 111 and the front-left speaker 112 of the display unit or either of them. Accordingly, a sound field with an ample ambience can be obtained using the speaker of the display unit 101.

At present, the sound of the 5.1 channel that uses the FR, FL, C, RR, RL, and S channels can be reproduced using a DVD. In the future, however, to increase the ambience, the sound of the 7.1 channel to which the two channels of the front right center (FRC) channel and the front left center (FLC) channel are added are assumed to be used. If the speakers of the FR and FL channels are connected, the sound of the 7.1 channel ought to be reproduced by using the speaker of the display unit that is easily located nearer to the center than these speakers in the FRC and FLC channels. The switcher 201 detects using the aforementioned method that the speaker of the 5.1 channel is connected. Further, the switcher 201 detects an EDID transmitted via the audio/video transmission line 231 and identifies that the speaker is connected to the display unit 101. Further, when the sound signal of the 7.1 channel is sent from the audio/video signal source 301 or 302, the sound signals of the FRC and FLC channels among them are sent to the display unit 101 via the audio/video transmission line 231. Besides, when the signal of the 7.1 channel can be reproduced in the aforementioned manner, if the sound signal from the audio/video signal source 301 or 302 belongs to the 5.1 channel, for example, the switcher 201 ought also to perform matrix operation and artificially produce the signals of the FRC and FLC channels, then send them to the display unit 101.

Besides, when the speakers 111, 112 of the aforementioned display unit 101 are utilized, the sound signals supplied to these speakers can be sent by the audio/video transmission line 231 together with video signals through this single transmission line. Accordingly, a speaker cable need not be drawn around every speaker and wiring is simplified.

Subsequently, the case where only the speaker 211 of the FR channel is not connected is taken into consideration with reference to the device block diagram of FIG. 3. Needless to say, a sound field with a normal ambience is not obtained as it is. At this occasion, after the switcher 201 detects that the speaker 211 is not connected, the menu shown typically in FIG. 8 ought also to be displayed. The user selects a number in the drawing, using a remote controller, for example. In FIG. 8, when 1 is selected, a sound is reproduced by a 2-channel stereophonic sound system using the speakers 111, 112 connected to the display unit (monitor). When 2 is selected, the sound is reproduced through the 5.1 channel using the speakers 111, 112 as the main speakers together with the speakers 210, 213, 214, 215 without using the speakers 211, 212. When 3 is selected, the sound is reproduced through the 5.1 channel using the speakers 211 to 215 assuming that the user connects the speaker 211. Further, when 4 is selected, the sound is reproduced through the 7.1 channel using the speakers 111, 112, 211 to 215 assuming that the user connects the speaker 211. The sound can be reproduced in accordance with the selection of the user.

These menu display and menu selection are convenient because they also work as countermeasures for incorrect operation of a speaker connection detection circuit when they can start at an optional timing according to a user instruction, for example, using a remote controller as well as when the speaker connection detection circuit detects a change of speaker arrangement. Further, they ought also to be performed according to only the user instruction without providing a speaker connection detection circuit in a switcher.

If a gain for a sound signal differs between the display unit 101 and the switcher 201 with an audio amplifier, a correct ambience cannot be reproduced. For this purpose, it is assumed that the gain value is standardized and adjusted. In the present circumstances, however, this standard is not available, and this standardization is not easy especially between the devices of different manufacturers. Because a remote controller is usually placed near by the user, a method of incorporating a microphone in this remote controller, generating a sound by every speaker, detecting this sound, and controlling a gain so that an optimum balance can be obtained is assumed. Further, there is also a method of requesting the user for the optimum adjustment by generating a sound, such as by issuing an instruction that indicates speaker arrangement in the display unit 101 and making the relevant speaker blink. Further, there is also a method of estimating the speaker arrangement by operating the speaker other than a speaker to be tested as microphone.

For example, when the sound of the 7.1 channel is reproduced using the speakers 111, 112, as described previously, it is also assumed that the power of the display unit 101 is disconnected halfway in a program consisted of only music. In this case, a number of sound channel to be output ought to be switched so that the sound of the 7.1 channel can be reproduced when the power of the display unit 101 turns on and the sound of the 5.1 channel can be reproduced when the power turns off. As to whether the power of the display unit 101 turns on or not, there is a method of detecting the retransmission of an EDID signal indicating speaker non-connection via the audio/video transmission line 231 using a hot plug function and of detecting an operating state of an audio/video input circuit of the display unit 101 by the switcher 201 via the audio/video transmission line 231. When the switcher 201 identifies that the power of the display unit is or was disconnected, the switcher 201 ought also to convert a sound to the 5.1 channel by matrix operation and send it to the respective speakers 210 to 215. Further, after the connection between the audio/video signal source 301 or 302 and the switcher 201 is disconnected once using the aforementioned hot plug function, a new EDID ought also to be sent and received. The audio/video signal source 301 or 302 sends a sounds which is converted to the 5.1 channel. As a result, a sound that is always suitable for a speaker state can be reproduced.

Besides, desirably, the switching that uses a hot plug function should estimate the time of approximately 0.5 to 2 seconds if the compatibility when a device of a different manufacturer is used is taken into consideration, and the device cannot function in the meantime. If both of the devices are machine types of the same manufacturer, the switching in a shorter time can be performed when it is confirmed that the devices are of the machine types corresponding to the hot plug operation in a short time. Because a internal control signal is sometimes sent in the vertical blanking period of a video signal, the disconnection time by the hot plug operation can be set below the conventional three frames (approximately 200 ms) by interlace scan even if an operation margin is taken into consideration. Accordingly, an effect that the disconnected time can be reduced is gained.

Further, when a speaker is connected after starting to reproduce sounds, a sound cannot be reproduced from the relevant speaker as is. A newly connected speaker can also function by operating the hot plug function according to a user instruction, loading a result from which the aforementioned speaker connection was detected newly on an EDID, and sending and receiving it between devices.

Figure 4:
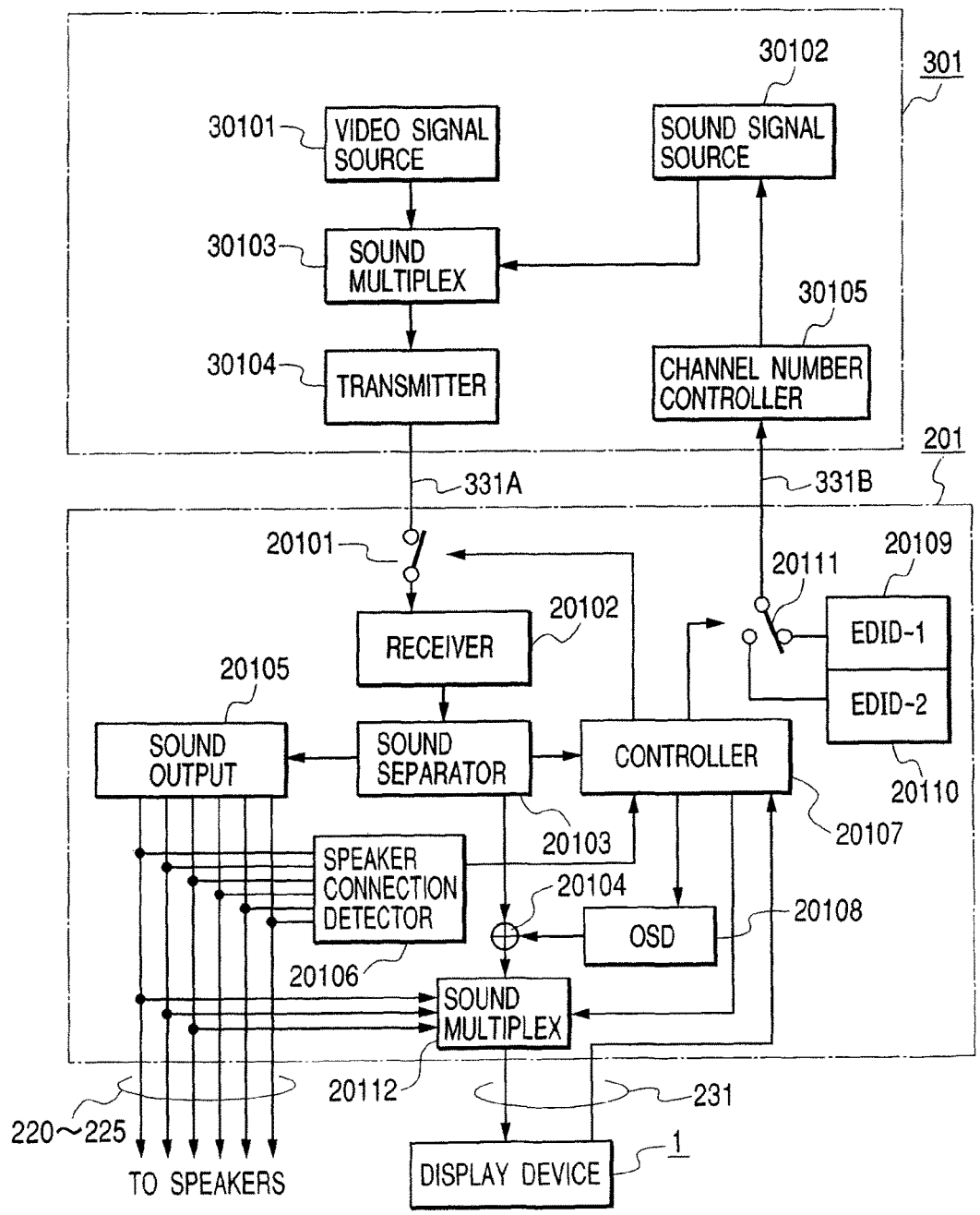
FIG. 4 is a block diagram of a signal source and a switcher used in the present invention.
Figure 5:
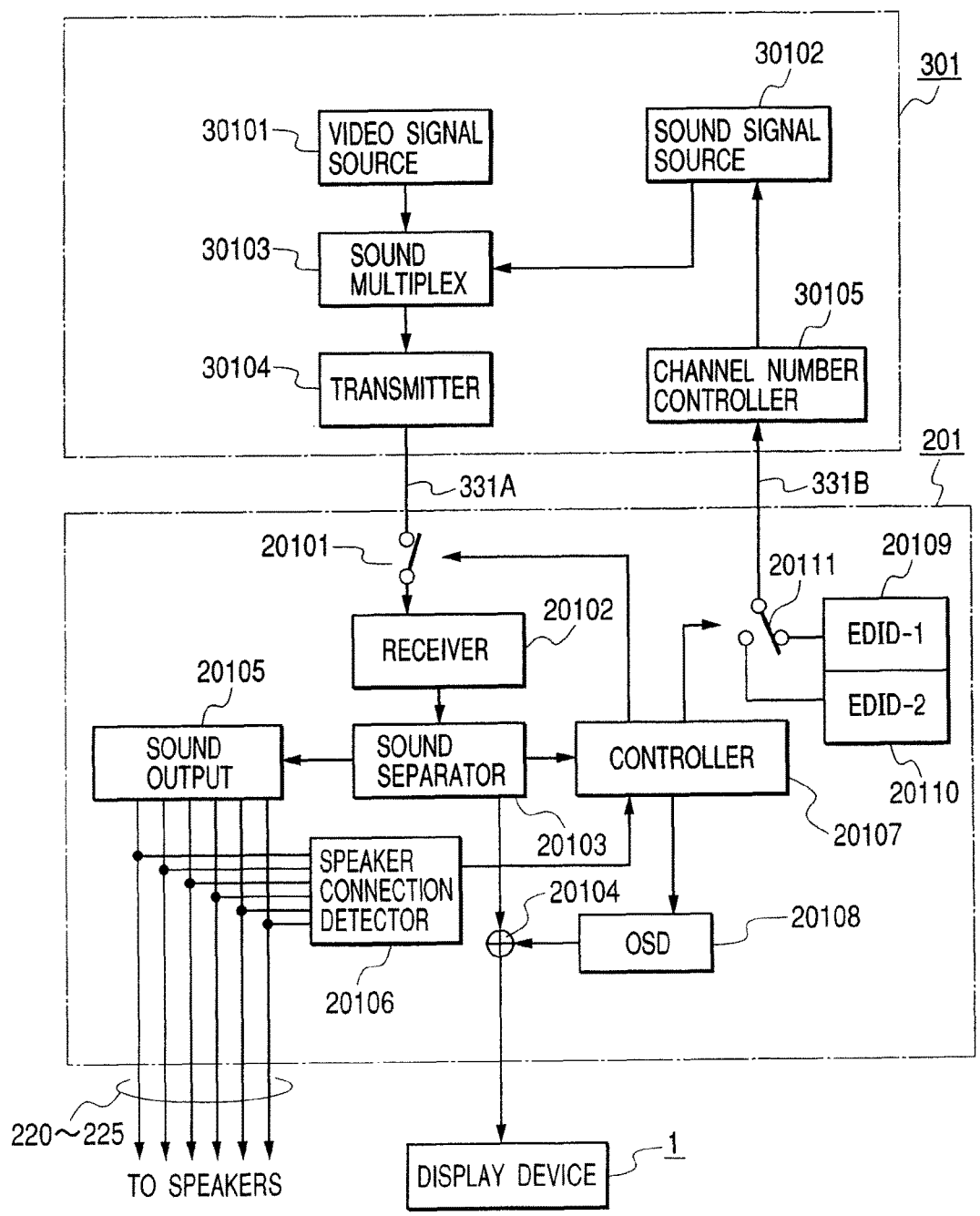
FIG. 5 is another block diagram of the signal source and the switcher used in the present invention.
Figure 6:
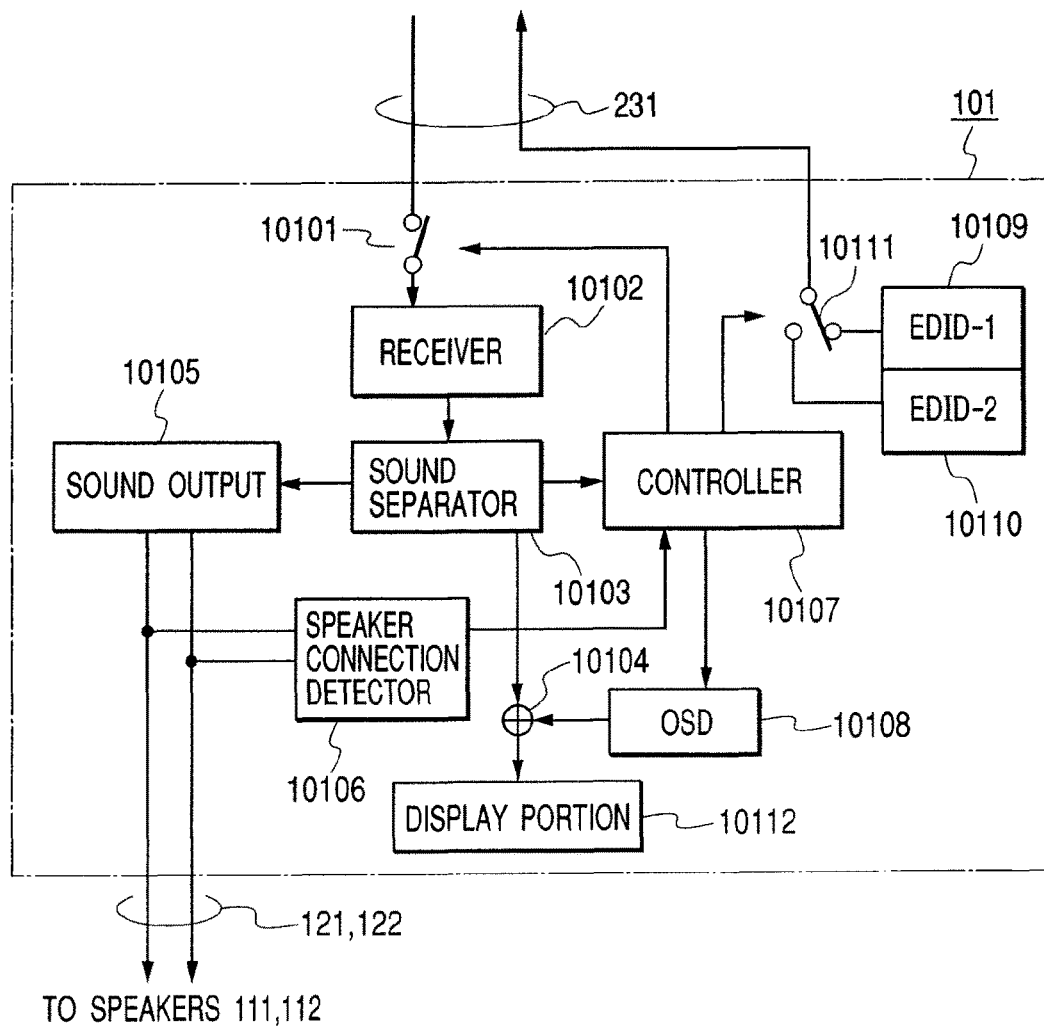
FIG. 6 is a block diagram of a display unit used in the present invention.

The block diagram of each component for realizing the aforementioned item is described with reference to FIG. 4, FIG. 5, and FIG. 6. FIG. 4 and FIG. 5 show the switcher 201 with an audio amplifier and the audio/video signal source 301 (or 302) respectively, and FIG. 6 shows the display unit 101.

First, the details are described with reference to FIG. 4. The audio/video signal source 301 is composed of a video signal source 30101, a sound signal source 30102, a sound multiplex circuit 30103, a transmitter 30104, and a channel number control circuit 30105. Besides, an audio/video transmission line 331 with a plug and play function for connection with the switcher 201 is practically a single bundle cable, but divided into 331A and 331B and shown for convenience' sake of explanation.

The video signal source 30101 sends video signal obtained from television broadcasting or a device, such as a DVD, to the sound multiplex circuit 30103. The sound signal source 30102 sends sound signal accompanied by this video signal to the sound multiplex circuit 30103 in the same manner. A number of sound channel from the sound signal source 30102 is determined according to the instruction of the channel number control circuit 30105. This number of sound channel may also be controlled by extracting the necessary number of sound channel from sound data contained in the television broadcasting or a device such as a DVD. Further, conversion of decreasing a number of sound channel as the need arises or conversion of increasing the number of sound channels by producing a signal artificially may also be performed. The instruction of this number of sound channel is determined with an EDID sent from the switcher 201 as described later. The video signal and sound signal multiplexed through the sound multiplex circuit 30103 are sent to the switcher 201 via the transmitter 30104.

Subsequently, the switcher 201 with an audio amplifier is composed of a switch 20101, a receiving circuit 20102, a sound separator 20103, an adding circuit 20104, an audio output circuit 20105, a speaker connection detector 20106, a controller 20107, an OSD circuit 20108, a first EDID generation circuit 20109, a second EDID generation circuit 20110, a switch 20111, and a sound multiplex circuit 20112. Further, the audio/video transmission line 231 with a plug and play function for connection with the display device 1 is practically a single bundle cable, but divided into two lines and shown for convenience' sake of explanation. The speaker cables 220 to 225 are independent in the same manner as FIG. 1 respectively.

The signal sent from the audio/video transmission line 331A with a plug and play function to the switcher 201 with an audio amplifier is first assigned to the switch 20101. This switch is used for the aforementioned plug and play function. For example, when an EDID is sent to post its own state between the devices at device power startup or when speaker connection is detected in operation and it is detected that the connection was changed, then the EDID is sent, the switch 20101 is opened once (approximately up to 2 seconds). The opening and closing timing is assigned from the controller 20107. The switch is closed at normal use and an audio/video signal is assigned to the receiving circuit 20102. Besides, the open circuit of the switch 20101 is shown typically. If at least there is an open circuit or a level change in a hot plug terminal, the sending and receiving operation of the audio/video signal can continue. A hot plug function may be realized a hot plug line independent from an audio/video transmission line.

Subsequently, a video signal and a sound signal are separated through the sound separator 20103. The former is assigned to the adding circuit 20104 and the latter is assigned to the audio output circuit 20105. Further, a number of sound channel of the sound signal received practically is posted to the controller 20107. The audio output circuit 20105 ought also to correspond to the 7.1 channel, for example, but, here, corresponds to the 5.1 channel in the same manner as FIG. 1.

The speaker connection detector 20106 according to the present invention is provided in the output of each channel and detects the presence of connection by measuring the impedance of a speaker connection terminal. In accordance with the result, the controller 20107 judges the number of sound channel of a sound most suitable for being reproduced and gives an instruction to the switch 20111. An EDID that can specify the optimum sound channel is selected from the first EDID generation circuit 20109 and the second EDID generation circuit 20110 and sent to the audio/video signal source 301. Needless to say, EDID are not limited to 2 types, but multiple EDID ought also be selected. Multiple whole EDID data need not be provided, but only multiple EDID data regarding a number of sound channel ought also be prepared and switched.

Figure 3:
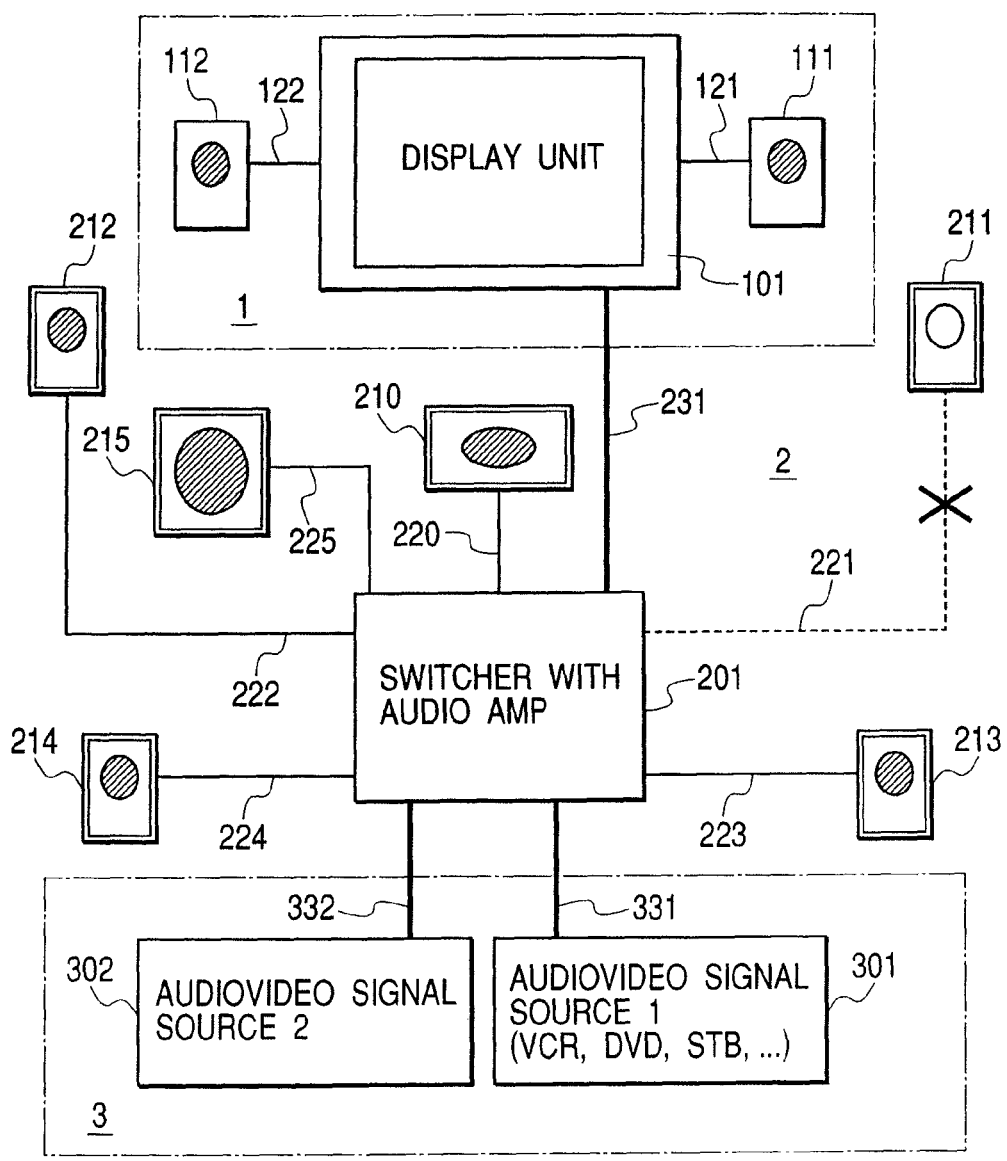
FIG. 3 is a device block diagram showing another embodiment of the present invention.

Further, to display the characters as shown previously in FIG. 7 and FIG. 8 and display the connection drawing as shown in FIG. 2 and FIG. 3, the controller 20107 sends an instruction to the OSD circuit 20108 and generates a necessary display signal, then assigns the signal to the addition circuit 20104. The signal is here added to or substituted for a video signal from the sound separator 20103. Besides, while display is being performed through the OSD circuit 20108, if information that is currently being broadcast is received, this information ought also be overlapped and displayed as a background image. When a reproduction image, such as an image obtained from a DVD is transmitted, however, this reproduction operation ought also to stop temporarily. The output of the addition circuit 20104 is assigned to the sound multiplex circuit 20112.

To reproduce a sound using the speakers 111, 112 of the display device 1 as shown in the embodiments of FIG. 2 and FIG. 3, the aforementioned controller 20107 gives an instruction to the sound multiplex circuit 20112 and multiplex a necessary 1- or 2-channel sound signal with a video signal, then sends it to the display device 1. A sound signal selects only the C channel or the FR and FL channels in accordance with the connected speaker number of the display device 1. Further, in the case of the 7.1 channel, the FRC and FLC channels may also be selected or the FRC and FLC channels may artificially be produced and sent from the sound signal of the 5.1 channel.

Figure 10:
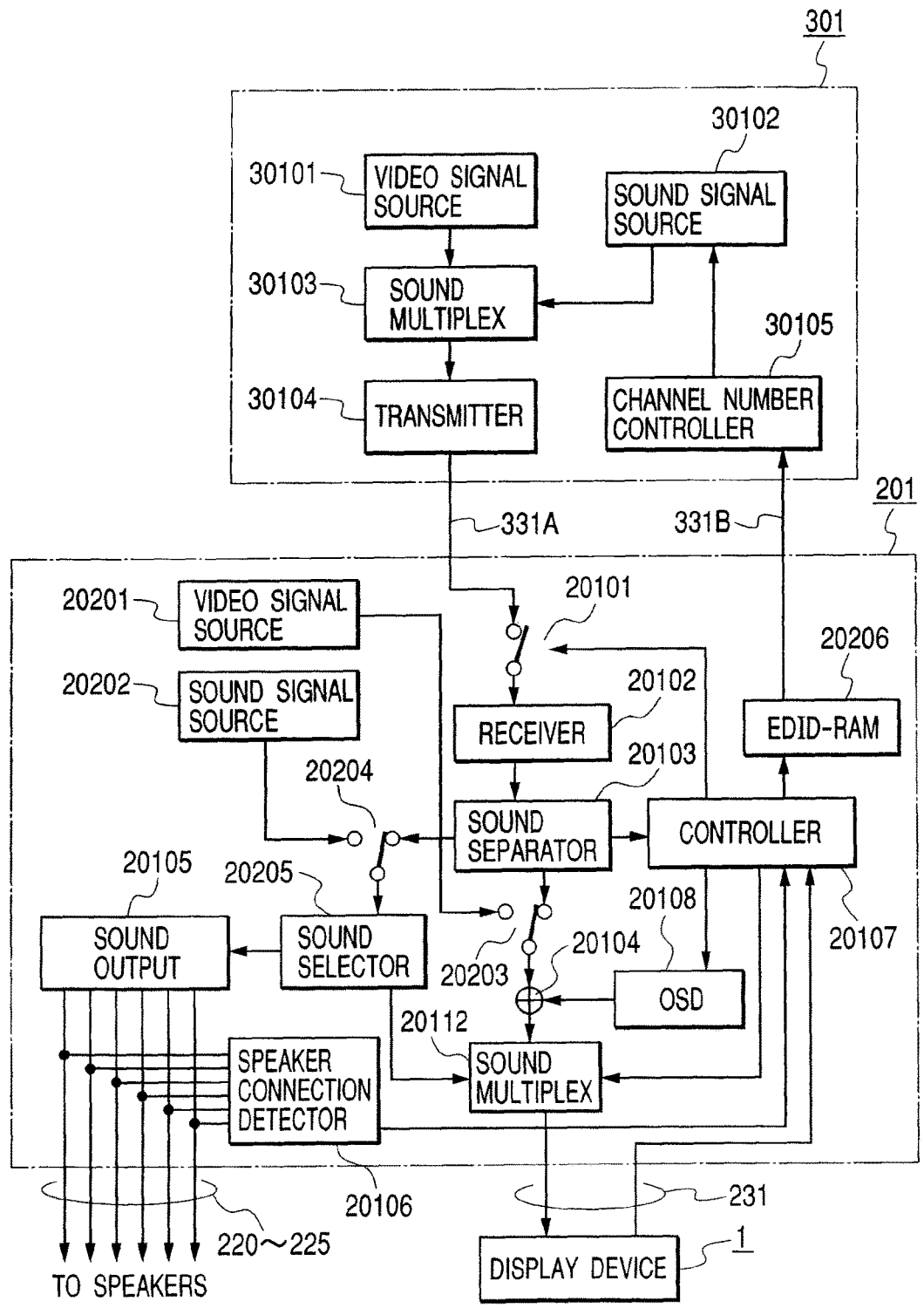
FIG. 10 is a block diagram of the signal source and a built-in signal source switcher used in the present invention.

FIG. 4 shows an example in which a signal is fetched in parallel from a part of speaker connection terminals and input to the sound multiplex circuit 20112, but the output of the sound separator 20103 ought also be input directly to the sound multiplex circuit 20112. The speaker connection terminal is mostly an analog signal, and, therefore, this terminal is advantageous when the sound separator 20103 and the sound multiplex circuit 20112 handle digital data. In FIG. 10 described later, the output of the sound separator 20103 ought also to be input to the sound multiplex circuit 20112 via the sound selector 20205.

Besides, whether the speaker of the display device 1 is connected practically or not is transmitted to the controller 20107 as EDID by similar means on the side of the display device 1 as described later. The controller 20107 determines an instruction to the aforementioned sound multiplex circuit 20112 based on these means.

FIG. 5 shows a block diagram in which the practical speaker connection is detected in the present invention, but a function of positively utilizing the speaker of the display device 1 is omitted. The sound multiplex circuit 20112 is omitted (from FIG. 5) in comparison with FIG. 4.

FIG. 6 is a block diagram showing an embodiment of the display unit 101 in the present invention. Because the configuration of FIG. 6 is the same as the switcher 201 of FIG. 4 and FIG. 5 except that a display portion 10112 is provided and a sound signal is assigned to two speakers 111, 112, a detailed explanation is omitted. FIG. 6 is characterized by having a speaker connection detection circuit 10106 for detecting whether the speaker having the display unit 101 is connected practically and being capable of receiving the optimum sound signal as described previously by sending the result to a control circuit and generating an EDID that posts a practically connected state to the switcher 201. The configuration of FIG. 6 is the same as the aforementioned switcher 201 regarding that a switch 10101 for a plug and play function is provided and the EDID signal generation circuit is not limited to two.

In the aforementioned explanation, as illustrated as an EDID-RAM 20206 in FIG. 10 described later, if the EDID signal generation circuit consists of a RAM (random access memory) or a flash RAM and the contents are rewritten by a control circuit composed of a CPU and such, a single generation circuit can further generate many types of signals.

Figure 9:
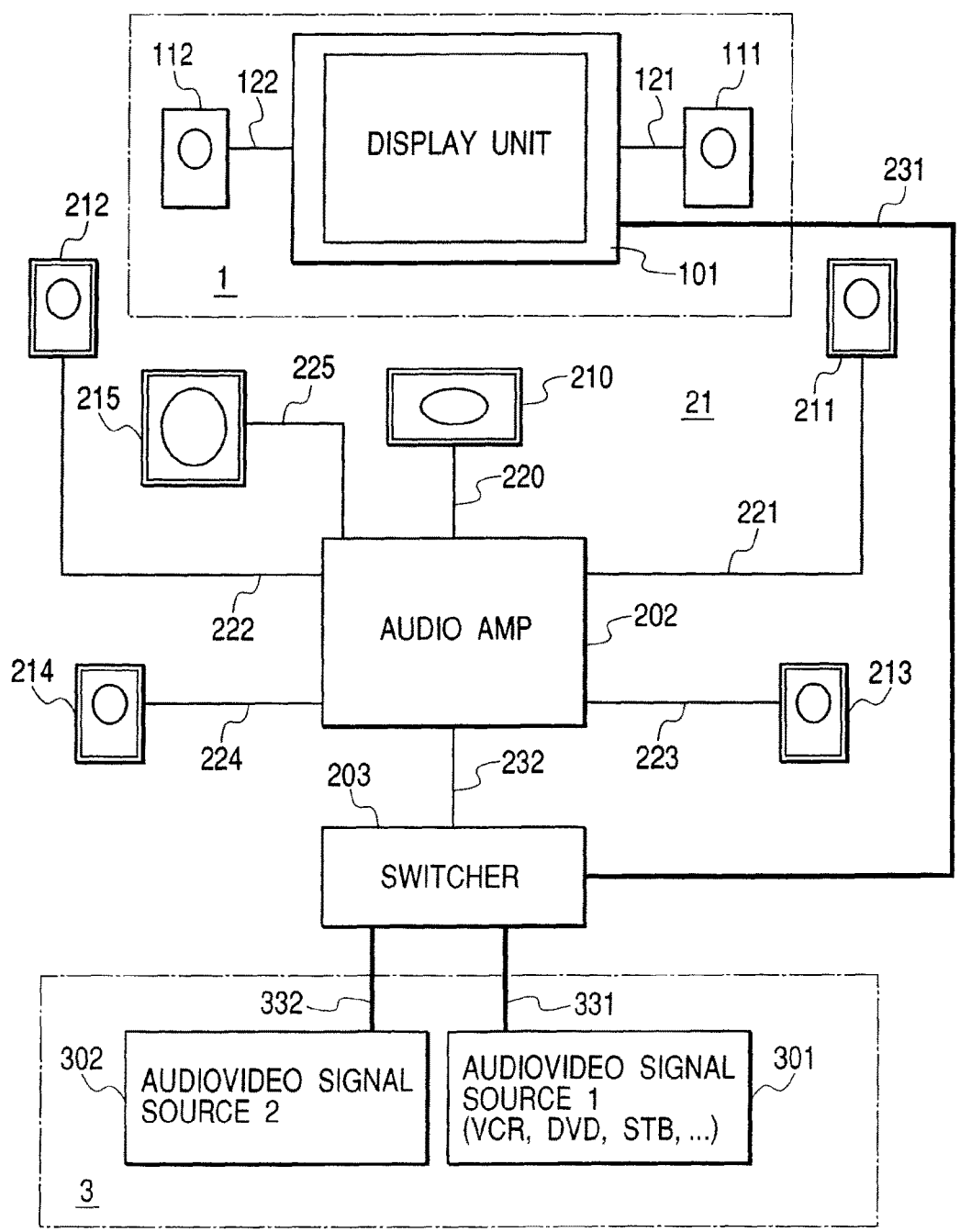
FIG. 9 is a device block diagram showing another embodiment of the present invention.

Subsequently, another embodiment of the present invention is described with reference to the device block diagram of FIG. 9. The point that differs from FIG. 1 is that the switcher 201 with an audio amplifier of FIG. 1 is divided into another component, such as an audio amplifier 202 and a switcher 203, in FIG. 9. In this case, regarding the audio/video transmission line 231 with a plug and play that supplies a signal to the display unit 101, if this line is connected to the switcher 203, the same operation as FIG. 1 is enabled. Further, the speakers 210 to 215 are connected to the audio amplifier 202 via the speaker cables 220 to 225 in the same manner as FIG. 1. Accordingly, the switcher 203 has a function of allocating a signal from the audio/video signal sources 301, 302. The switcher not only sends a video signal to the display unit 101, but also, as shown in the embodiment in which each channel of a sound signal is described previously, is divided into the audio amplifier 202 and the display unit 101 and sent in accordance with the practically connected state of the speaker.

Operation varies with whether a sound transmission line 232 to which the audio amplifier 202 and the switcher 203 are connected has a plug and play function or not. First, when a function is provided, this function is newly implemented between the audio amplifier 202 and the switcher 203. Another function is the same as FIG. 1. On the other hand, if the function is not provided, the user posts the speaker connected to the audio amplifier 202 practically to a device. For example, a method of inputting a channel that is connected using a remote controller or changing a display unit into a touch panel type one, issuing an indication as shown in FIG. 2, and entering data by touching the mark of the connected speaker is assumed.

Besides, in each embodiment, the case where there are two speakers having the display unit 101 is described as an example. Even if one or three speakers are provided, the present invention can apply to them, and multiple-channel sound reproduction can be realized using these speakers in the same concept as the description of the present invention.

Subsequently, another embodiment of the present invention is described with reference of the device block diagram of FIG. 10. The case where an audio/video signal source, such as a DVD, an STB and so on, are incorporated in the switcher 201 with an audio amplifier of FIG. 1 is assumed. In FIG. 10, 20201 is a video signal source, 20202 is a sound signal source, 20203 is a video signal selector, 20204 is a sound signal selector, 20205 is a sound selector, and 20106 is an EDID-RAM. The same component as shown in FIG. 4 is shown assigning the same number to it.

In FIG. 10, the EDID-RAM 20206 is used, but, as described in the explanation of FIG. 4, the same operation as the case where the multiple EDIDs of FIG. 4 are switched is performed. Further, the sound selector 20205 is provided. A sound signal transmitted from the output of the sound separator 20103 to the display device 1 is extracted and sent to the sound multiplex circuit 20112. Basically, however, the operation is the same operation as FIG. 4. Because the same operation as FIG. 4 is performed to the external signal source 301 in particular, an explanation of operation is omitted.

When the switches 20203 and 20204 select the video output of the internal video signal source 20201 and the audio output of the internal sound signal source 20202, EDID data need not be sent and received. A controller 20107 directly controls (not shown) the sound signal source 20202 and sets the optimum a number of sound channel of a sound to be reproduced. Because another operation is the same operation as the external signal source 301, it is omitted.

Figure 11:
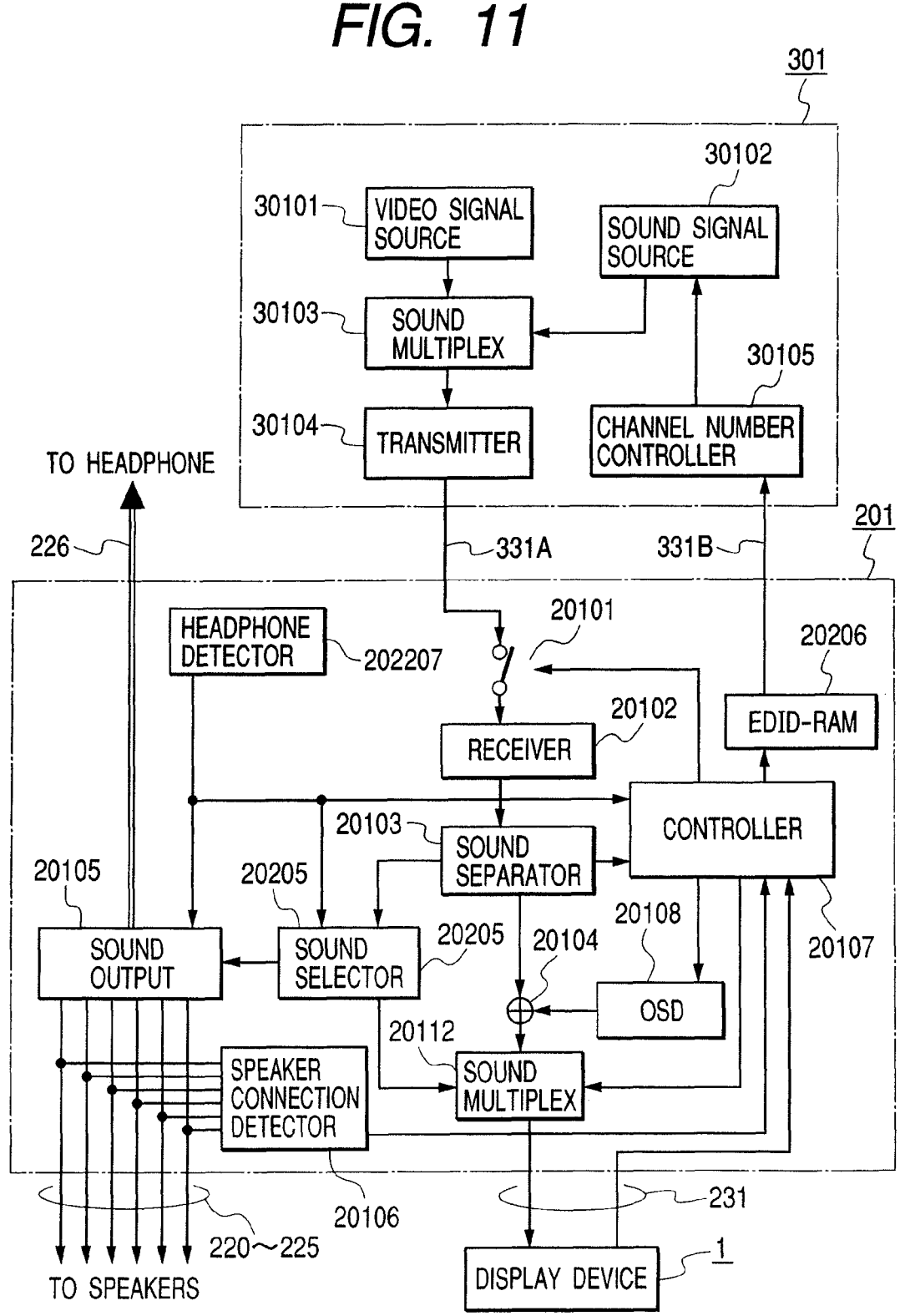
FIG. 11 is another block diagram of the signal source and the switcher used in the present invention.

Subsequently, another embodiment of the present invention is described with reference to the device block diagram of FIG. 11. In the diagram, a headphone terminal is provided in the switcher 201 with an audio amplifier of FIG. 1. In FIG. 11, 226 is a headphone cable that connects the headphone terminal (not shown) and the headphone of the switcher 201 and 20207 is a headphone detector. The same component as shown in FIG. 10 is shown assigning the same number to it. The basic operation is omitted because it is the same as FIG. 10, and only the headphone connection operation is described below.

When a headphone is connected to a headphone terminal, the headphone detector 20207 detects the connection of the headphone by opening and closing a mechanical contact or detecting the impedance detection of the headphone. A headphone detection signal is input to the audio output circuit 20105 and the sound selector 20205 and stops (mutes) the audio output to the speaker cables 220 to 225 and the audio output to the sound multiplex circuit 20112. Consequently, the audio output of the speaker connected to the switcher 201 and all the speakers connected to the display device 1 can be stopped. To stop the sound connected to a display device, there is also a method of sending a control signal to the display device so that the sound volume of the display device 1 can be reduced except that the input of the aforementioned sound multiplex circuit 20112 is muted.

Hereupon, for example, if it is assumed that the speaker arrangement of the 5.1 channel is used before a headphone is connected, a number of sound channel of a sound to be reproduced, such as the connected headphone is stereophonic or monaural, is decreased. The change of this number of sound channel rewrites the speaker arrangement information of the EDID-RAM 20206 via the controller 20107 and is posted to the signal source 301 using the hot plug function of the switch 20101. Simultaneously, the signal source 301 outputs sound data suitable for a headphone.

Figure 12:
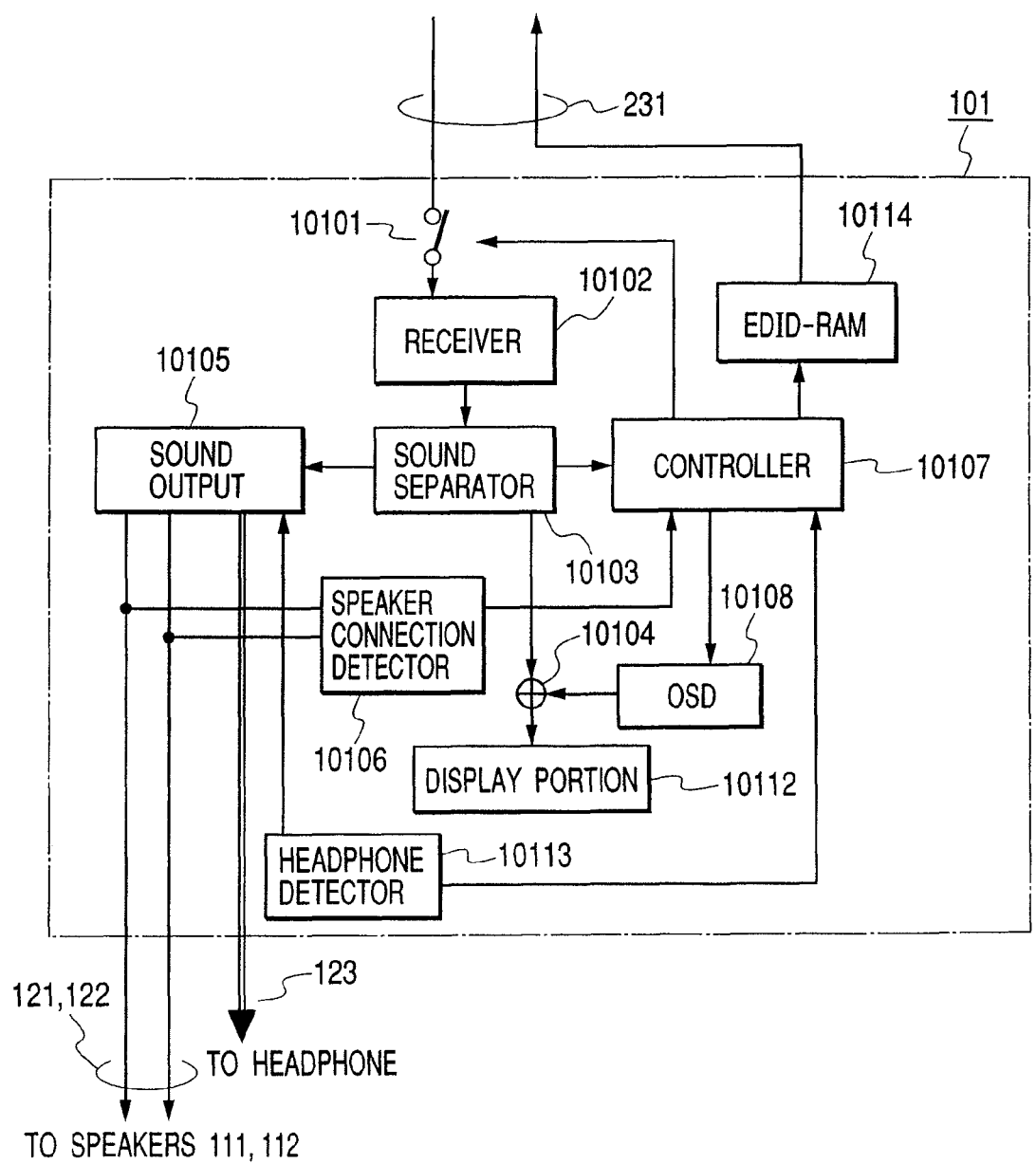
FIG. 12 is another block diagram of the display unit used in the present invention.

Subsequently, another embodiment of the present invention is described with reference of the block diagram of the display unit of FIG. 12. In the drawing, a headphone terminal is provided in the display unit 101 of FIG. 1. In FIG. 12, 123 is a headphone cable to which the headphone terminal (not shown) and the headphone of the display unit 101 are connected. Numeral 10113 is a headphone detection circuit and 10114 is an EDID-RAM. The part in which the EDID-1 and EDID-2 of FIG. 6 are switched by the switch 10111 is substituted for the EDID-RAM in the same manner as the example of FIG. 10. In addition, even the same component as shown in FIG. 6 is shown assigning the same number to it. The basic operation is omitted because it is the same as FIG. 6, and only the headphone connection operation is described below.

When a headphone is connected to a headphone terminal, the headphone detection circuit 10113 detects the connection of the headphone by opening and closing a mechanical contact or detecting the impedance of the headphone. A headphone detection signal is input to the audio output circuit 20105 and the sound selection circuit 10105 and stops (mutes) the audio output to the speaker cables 121, 122. Consequently, the audio output of the speaker connected to the display unit 101 can be stopped.

Hereupon, for example, when it is assumed that a speaker is not connected before a headphone is connected, a sound reproduction function is added by connecting the headphone. This change rewrites the speaker arrangement information of the EDID-RAM 10114 via control 10107 and is posted to a sound processing unit (not shown), such as an audio output unit and a switcher, using the hot plug function of the switch 20101. A display unit receives sound data suitable for a headphone and a sound is reproduced by the headphone. Further, if the sound processing unit connected to the audio/video transmission line 231 with a plug and play function is an audio amplifier to which speakers are connected, the audio output of these speakers need to be stopped at the same time. Accordingly, the speaker arrangement information of the aforementioned EDID-RAM can be posted to the audio amplifier when it is rewritten.

Further, if the dedicated control line and remote controller are used jointly though they are not shown, a speaker can be muted by directly controlling an audio amplifier. The method of jointly using the control line and the remote controller is effective when a stereophonic speaker cannot be distinguished from a stereophonic headphone. In this case, if the stereophonic headphone is connected, the speaker arrangement of the EDID-RAM is identical when the stereophonic speaker is connected to the display unit 101.

In the explanation of the aforementioned embodiment, the switcher 201 is separated from the audio/video signal source 301 or 302 or the display device 1, but even the configuration in which the audio/video signal source 301 or 302 or the display device 1 is incorporated in the switcher 201 ought to be acceptable. In this case, the configuration in which connection information is sent from the switcher 201 to the audio/video signal source 301 or 302 is omitted, but the configuration of number of sound channel control that corresponds to the detected connected state is identical with that of the aforementioned embodiment.

Further, when a television broadcasting signal has program information, a number of sound channel ought also be controlled based on the program information. Program information is used to display an electronic program guide on a display. This program usually indicates a schedule of a program in the future of each channel. Further, program information includes a program title, a name (number of sound channel) of a broadcasting station, broadcasting start and end times of a program, types (movie, news, and drama) of the program, and data regarding the number of sound channel of a sound reproduced in the program.

The broadcasting signal of news program usually has the sound signal of the 2 channel. The broadcasting signal of movie and music program often have the sound signal of the 5.1 channel or 7.1 channel. Accordingly, the data indicating that the number of sound channel is the 2 channel may be added to the broadcasting signal of news, and the data indicating that the number of sound channel is 5.1 channel or 7.1 channel may be added to the broadcasting signals of movie and music programs.

Accordingly, as another embodiment of the present invention, the sound signal source 30102 ought also be controlled in a channel number control circuit by extracting program information from the broadcasting signal of the program selected by the user in accordance with the data of the number of sound channel contained in the extracted program information. Accordingly, when a news program is selected and the data indicating that the number of sound channel is the 2 channel is added to the broadcasting signal, a sound is reproduced through the 2 channel even if a device is provided with the speaker of the 5.1 channel. On the other hand, when a movie program is selected and the data indicating that the number of sound channel is the 2 channel is added to the broadcasting signal, and the device is provided with the speaker of the 5.1 channel, the sound is reproduced by utilizing all speakers. Such configuration can realize automatic control of the number of sound channel in accordance with the contents of the program.

Moreover, in the present invention, if the program with 2 channel audio signal is indicated as a "movie" program information which the program contains, the program can be reproduced artificially through the 5.1 channel. Further, if the program with 7.1 channel audio signal is Indicated as "news" in a program information in which the program contains, the program can be reproduced artificially through the 2 channel. That is, this embodiment is characterized by using the data of the program type more preferentially than the number of sound channel data contained in program information as data for determining a number of sound channel of a sound to be reproduced.

More specifically, the audio/video signal source 301 including a receiver of a television broadcasting signal reproduces a sound through the 5.1 channel or 7.1 channel when the program information indicates a "movie". The source 301 reproduces a sound through the 2 channel when the program information indicates "news". For these function, a table is constructed by presetting the data of the appropriate number of sound channel of a sound to be reproduced every program type. The data table is used to set the number of sound channel of a sound to be reproduced. The aforementioned table can be stored in a microcomputer memory or another memory that is not shown. The audio/video signal source 301 (built-in microcomputer) extracts program information from the received television broadcasting signal and judges the contents of the data of a program type contained in the program information. The judgment result is referred to with the table stored in the aforementioned memory and the microcomputer reads the data of a number of sound channel of a sound to be reproduced that corresponds to the judged program type from the aforementioned memory. Using this data of the number of sound channel of the sound to be reproduced, the program sound number of sound channel control circuit controls the sound signal source 30102 and controls the number of sound channel of the sound to be reproduced. Such configuration can reproduce a sound in appropriate number of sound channel in accordance with a program type. Regarding the number of reproduced sound channel control that uses the aforementioned table, the user ought to be able to select permission/prohibition. At that time, desirably, using an OSD circuit, a message regarding the selection ought to be displayed on a display and processed interactively with the user.

According to the present invention, a multiple-channel sound signal can suitably be reproduced in accordance with a connected state of a speaker. Further, besides the speaker connected to a switcher and such, the speaker of a display device can be used jointly and a higher sound effect can be obtained. Further, because the connected state of the speakers are displayed on the display device, an user would easily and accurately connects the speakers.

What is claimed is:
1. A sound processing method for transmitting sound output information in a sound processing unit connectable to a video sound signal outputting unit and a display device, the sound processing unit selectively outputs sound according to a sound signal from the video sound signal outputting unit by a first speaker connecting to the sound processing unit or by a second speaker built in the display device, the method comprising the steps of:
transmitting sound output information held in memory, including information about sound channels of the sound processing unit, to the video sound signal outputting unit;
notifying the video sound signal outputting unit of a change in the sound output information by putting hot plug means for changing a state of connection with the video sound signal outputting unit into a disconnected state for a prescribed time period;
transmitting the changed sound output information to the video sound signal outputting unit according to a request of the video sound signal outputting unit after the disconnected state for the prescribed time period;
starting output of sound on the first speaker when the display device stops output of sound on the second speaker, and requesting the sound processing unit to start output of sound on the first speaker by a first control signal; and
stopping output of sound on the first speaker when the display device starts output of sound on the second speaker, and requesting the sound processing unit to stop output of sound on the first speaker by a second control signal.
2. A sound processing system, comprising:
a sound processing unit connected to a first speaker;
a video sound signal outputting unit; and
a display device including a second speaker,
wherein the sound processing unit is connectable to the video sound signal outputting unit and the display device, and
wherein the sound processing unit is configured to:
selectively output sound, according to a sound signal from the video sound signal outputting unit, by the first speaker connected to the sound processing unit or by the second speaker included in the display device,
transmit sound output information held in memory, including information about sound channels of the sound processing unit, to the video sound signal outputting unit,
notify the video sound signal outputting unit of a change in the sound output information by putting hot plug means for changing a state of connection with the video sound signal outputting unit into a disconnected state for a prescribed time period,
transmit the changed sound output information to the video sound signal outputting unit according to a request of the video sound signal outputting unit after the disconnected state for the prescribed time period,
start output of sound on the first speaker when the display device stops output of sound on the second speaker, and request the sound processing unit to start output of sound on the first speaker by a first control signal, and
stop output of sound on the first speaker when the display device starts output of sound on the second speaker, and request the sound processing unit to stop output of sound on the first speaker by a second control signal.

* * * * *